(12) United States Patent
Taya (10) Patent No.: US 12,516,223 B2
(45) Date of Patent: Jan. 6, 2026

(54) HIGH-FREQUENCY DIELECTRIC HEATING ADHESIVE SHEET

(71) Applicant: LINTEC Corporation, Tokyo (JP)

(72) Inventor: Naoki Taya, Tokyo (JP)

(73) Assignee: LINTEC Corporation, Tokyo (JP)

(*) Notice: Subject to any disclaimer, the term of this patent is extended or adjusted under 35 U.S.C. 154(b) by 255 days.

(21) Appl. No.: 18/012,788

(22) PCT Filed: Jun. 25, 2021

(86) PCT No.: PCT/JP2021/024194
§ 371 (c)(1),
(2) Date: Dec. 23, 2022

(87) PCT Pub. No.: WO2022/004604
PCT Pub. Date: Jan. 6, 2022

(65) Prior Publication Data
US 2023/0303892 A1    Sep. 28, 2023

(30) Foreign Application Priority Data

Jun. 30, 2020  (JP) .................................. 2020-113564

(51) Int. Cl.
*C09J 7/35* (2018.01)
*B32B 7/12* (2006.01)
(Continued)

(52) U.S. Cl.
CPC .  *C09J 7/35* (2018.01); *C09J 7/10* (2018.01); *C09J 9/02* (2013.01); *C09J 2301/304* (2020.08);
(Continued)

(58) Field of Classification Search
CPC .......... C09J 7/35; C09J 7/10; C09J 9/02; C09J 2301/304; B32B 7/12
See application file for complete search history.

(56) References Cited

U.S. PATENT DOCUMENTS

| | | | |
|---|---|---|---|
| 2011/0143076 A1* | 6/2011 | Taya | G11B 7/256 428/343 |
| 2015/0314574 A1* | 11/2015 | Mogawa | B32B 27/34 428/218 |

(Continued)

FOREIGN PATENT DOCUMENTS

| | | |
|---|---|---|
| CN | 102105935 A | 6/2011 |
| CN | 109890923 A | 6/2019 |

(Continued)

OTHER PUBLICATIONS

International Search Report issued in International Application No. PCT/JP2021/024194, dated Aug. 31, 2021, with English translation.

(Continued)

*Primary Examiner* — Joanna Pleszczynska
(74) *Attorney, Agent, or Firm* — Rimon P.C.

(57) ABSTRACT

A high-frequency dielectric heating adhesive sheet includes an adhesive layer that at least contains a thermoplastic resin and a dielectric material that generates heat upon application of a high-frequency electric field. The adhesive layer contains silane-modified polyolefin as the thermoplastic resin, and a melt flow rate (MFR) at 190 degrees C. of the thermoplastic resin is in a range from 2 g/10 min to 50 g/10 min.

12 Claims, 3 Drawing Sheets

(51) Int. Cl.
*C09J 7/10* (2018.01)
*C09J 9/02* (2006.01)

(52) U.S. Cl.
CPC ...... *C09J 2301/408* (2020.08); *C09J 2423/00* (2013.01)

(56) References Cited

U.S. PATENT DOCUMENTS

2019/0283334 A1 9/2019 Ishikawa
2019/0352546 A1 11/2019 Taya et al.

FOREIGN PATENT DOCUMENTS

| CN | 110291166 A | 9/2019 |
| JP | 2002-097445 A | 4/2002 |
| JP | 2003-193009 A | 7/2003 |
| JP | 2003-238745 A | 8/2003 |
| JP | 2004-00977 A | 1/2004 |
| JP | 2016-068426 A | 5/2016 |
| JP | 2018-177825 A | 11/2018 |
| JP | 2019-167447 A | 10/2019 |
| JP | 2020-70367 A | 5/2020 |
| WO | 2018-079354 A1 | 5/2018 |
| WO | 2018-147352 A1 | 8/2018 |

OTHER PUBLICATIONS

English translation of the International Preliminary Report on Patentability issued in corresponding International Patent Application No. PCT/JP2021/024194, dated Dec. 13, 2022.
The First Office Action issued for the corresponding Chinese patent application No. 202180047057.5, dated Nov. 21, 2024.
Office Action dated Feb. 18, 2025, issued in corresponding Japan Patent Application No. 2022-533960, 9 pages.

* cited by examiner

HIGH-FREQUENCY DIELECTRIC HEATING ADHESIVE SHEET

CROSS REFERENCE TO RELATED APPLICATIONS

This application is the U.S. National Phase under 35 U.S.C. § 371 of International Application No. PCT/JP2021/024194, filed on Jun. 25, 2021, which claims the benefit of Japanese Application No. 2020-113564, filed on Jun. 30, 2020, the entire contents of each are hereby incorporated by reference.

TECHNICAL FIELD

The present invention relates to a high-frequency dielectric heating adhesive sheet.

BACKGROUND ART

As a method of bonding adherends having difficulty in bonding, there has been recently proposed, for example, a method including performing a dielectric heating treatment, an induction heating treatment, a supersonic welding treatment, a laser welding treatment, or the like with an adhesive agent interposed between the adherends, the adhesive agent being made by mixing a heat-generating material into a predetermined resin.

A bonding method using glass as adherends is exemplified by techniques as described below.

For example, Patent Literature 1 describes, as a thermoplastic resin composition for bonding glass and an inorganic-reinforced thermoplastic resin, a thermoplastic resin composition containing: a heat-generating body that generates heat by high-frequency induction; and a thermoplastic resin modified by a monomer having a functional group reactive with inorganic substances in the presence of moisture and having a melting point in a range from 90 degrees C. to 200 degrees C.

For example, Patent Literature 2 describes a dielectric heating adhesive film for bonding a plurality of adherends made from the same or different materials. The dielectric heating adhesive film contains a polyolefin resin having a polar site and a dielectric filler blended at a predetermined ratio.

As another bonding method, for example, Patent Literature 3 describes a glass adhesion sheet having high adhesion performance to a glass surface through vacuum lamination. The glass adhesion sheet contains a silane-modified polyethylene resin in which an ethylenically unsaturated silane compound is graft-polymerized onto low-density polyethylene.

CITATION LIST

Patent Literature(s)

Patent Literature 1: JP2002-097445 A
Patent Literature 2: WO2018/147352
Patent Literature 3: JP2016-068426 A

SUMMARY OF THE INVENTION

Problem(s) to be Solved by the Invention

In a case of using the thermoplastic resin composition described in Patent Literature 1, a lot of energy is required for adhesion to glass. In a case of using the glass adhesion sheet described in Patent Literature 3, a pressure retaining time during vacuum lamination required for adhesion to glass is long.

Patent Literature 2 also describes a glass material as an exemplary adherend. The dielectric heating adhesive film described in Patent Literature 2, however, is not likely to have sufficient bonding strength to the glass material.

An object of the invention is to provide a high-frequency dielectric heating adhesive sheet bondable, even with low consumption energy, to glass with high bonding strength.

Means for Solving the Problem(s)

According to an aspect of the invention, there is provided a high-frequency dielectric heating adhesive sheet including an adhesive layer that at least contains a thermoplastic resin (A) and a dielectric material that generates heat upon application of a high-frequency electric field, in which the adhesive layer contains silane-modified polyolefin as the thermoplastic resin (A), and a melt flow rate (MFR) at 190 degrees C. of the thermoplastic resin (A) is in a range from 2 g/10 min to 50 g/10 min.

In the high-frequency dielectric heating adhesive sheet according to the aspect of the invention, a softening temperature of the high-frequency dielectric heating adhesive sheet is preferably 50 degrees C. or more.

In the high-frequency dielectric heating adhesive sheet according to the aspect of the invention, a storage modulus at 20 degrees C. of the high-frequency dielectric heating adhesive sheet is preferably 5 MPa or more.

In the high-frequency dielectric heating adhesive sheet according to the aspect of the invention, a peak temperature of a loss tangent of the high-frequency dielectric heating adhesive sheet is preferably 30 degrees C. or less.

In the high-frequency dielectric heating adhesive sheet according to the aspect of the invention, a volume content ratio of the dielectric material in the adhesive layer is preferably in a range from 5 vol % to 50 vol %.

In the high-frequency dielectric heating adhesive sheet according to the aspect of the invention, the dielectric material is preferably a dielectric filler (B).

In the high-frequency dielectric heating adhesive sheet according to the aspect of the invention, the dielectric filler (B) preferably contains at least one selected from the group consisting of zinc oxide, silicon carbide, barium titanate, and titanium oxide.

In the high-frequency dielectric heating adhesive sheet according to the aspect of the invention, it is preferable that a volume average particle diameter of the dielectric filler (B) is in a range from 1 μm to 30 μm, and the volume average particle diameter is a volume average particle diameter obtained by measuring a particle size distribution of the dielectric filler (B) by a laser diffraction/scattering method and performing calculation from a result of the particle size distribution measurement in accordance with JIS Z 8819-2: 2001.

In the high-frequency dielectric heating adhesive sheet according to the aspect of the invention, a thickness of the high-frequency dielectric heating adhesive sheet is 5 μm or more.

According to the aspect of the invention, a high-frequency dielectric heating adhesive sheet bondable, even with low consumption energy, to glass with high bonding strength can be provided.

DESCRIPTION OF EMBODIMENT(S)

High-Frequency Dielectric Heating Adhesive Sheet

A high-frequency dielectric heating adhesive sheet according to an exemplary embodiment includes an adhesive layer that at least contains a thermoplastic resin (A) and a dielectric material that generates heat upon application of a high-frequency electric field. The adhesive layer contains silane-modified polyolefin as the thermoplastic resin (A). The melt flow rate (MFR) at 190 degrees C. of the thermoplastic resin (A) is in a range from 2 g/10 min to 50 g/10 min. The high-frequency electric field is an electric field of which direction is reversed by high frequency waves.

The dielectric material is a material that generates heat upon application of a high-frequency electric field. Preferably, the dielectric material is a material that generates heat upon application of a high-frequency electric field having a frequency range from 3 MHz to 300 MHz. Preferably, the dielectric material is at least one of a dielectric resin or a dielectric filler. The dielectric material is more preferably a dielectric filler (B), because the dielectric filler (B) contained in the high-frequency dielectric heating adhesive sheet is not likely to deteriorate when the high-frequency dielectric heating adhesive sheet is processed.

Explanation is made below about a case where the high-frequency dielectric heating adhesive sheet according to the exemplary embodiment contains the dielectric filler (B) as the dielectric material.

Thermoplastic Resin (A)

The adhesive layer contains one or more thermoplastic resins (A). The adhesive layer at least contains silane-modified polyolefin as the thermoplastic resin (A).

MFR of Thermoplastic Resin

The MFR at 190 degrees C. of the thermoplastic resin (A) is 2 g/10 min or more, preferably 2.5 g/10 min or more, and more preferably 3 g/10 min or more.

The MFR at 190 degrees C. of the thermoplastic resin (A) is 50 g/10 min or less, preferably 30 g/10 min or less, and more preferably 20 g/10 min or less.

When the MFR at 190 degrees C. of the thermoplastic resin (A) is 2 g/10 min or more, sheet formability is excellent and wet-spreadability of the adhesive layer at the time of bonding is favorable, easily exhibiting bonding strength in a short time.

When the MFR at 190 degrees C. of the thermoplastic resin (A) is 50 g/10 min or less, viscosity of the adhesive layer under a dielectric heating treatment is not likely to be too low. When the viscosity of the adhesive layer is too low, the resin amount between adherends is reduced at the time of bonding, making it difficult to exhibit bonding strength. Inhibiting the decrease in viscosity easily provides bonding strength.

When the adhesive layer only contains, as the thermoplastic resin (A), silane-modified polyolefin, the MFR at 190 degrees C. of the silane-modified polyolefin satisfies the above MFR range at 190 degrees C. of the thermoplastic resin (A).

When the thermoplastic resin (A) in the adhesive layer is a mixture that contains not only silane-modified polyolefin but also any other thermoplastic resin, the MFR at 190 degrees C. of the mixture in the adhesive layer satisfies the above MFR range at 190 degrees C. of the thermoplastic resin (A).

The MFR at 190 degrees C. of the thermoplastic resin (A) is measurable by a method described in Examples below.

Silane-Modified Polyolefin

Although not particularly limited, silane-modified polyolefin is preferably, for example, at least one selected from the group consisting of a copolymer of a silyl group-containing compound and olefin and silane-modified polyolefin in which a silyl group-containing compound is graft-polymerized onto polyolefin.

Preferably, olefin copolymerized with a silyl group-containing compound is, for example, α-olefin having 2 to 20 carbon atoms. Preferably, α-olefin having 2 to 20 carbon atoms is, for example, at least one selected from the group consisting of ethylene, propylene, 1-butene, 1-pentene, 1-hexene, 1-octene, 1-heptene, 4-methyl-1-pentene, 4-methyl-1-hexene, and 4,4-dimethyl-1-pentene. More preferably, α-olefin having 2 to 20 carbon atoms is at least one of ethylene or propylene. One or two or more of olefins may be copolymerized with a silyl group-containing compound.

Polyolefin onto which a silyl group-containing compound is graft-polymerized is exemplified by a homopolymer of the above-described olefins and a copolymer of two or more thereof. A homopolymer or a copolymer having a monomer unit derived from at least one olefin of ethylene or propylene is preferable. Further, silane-modified polyolefin in which a silyl group-containing compound is graft-polymerized onto polyolefin having a reactive group beforehand is also preferable.

Examples of the silyl group-containing compound include vinylsilane such as vinyltrimethoxysilane, vinyltriethoxysilane, vinyltripropoxysilane, vinyltriisopropoxysilane, vinyltributoxysilane, vinyltriphenoxysilane, vinyltribenzyloxysilane, vinyltrimethylenedioxysilane, vinylpropionyloxysilane, vinyltriacetoxysilane, vinyltricarboxysilane, vinyltriacetylsilane, vinyltrichlorosilane, vinyltrismethylethylketoximesilane, vinyltriisopropenoxysilane, and vinylmethyldimethoxysilane; (meth)acrylsilanes such as (meth)acryloxymethyltrimethoxysilane; and styrylsilanes such as styryltrimethoxysilane. Herein, the "(meth)acryl" is used as a term referring to both "acryl" and "methacryl". The same applies to other similar terms.

Any Other Thermoplastic Resin

The adhesive layer may contain any other thermoplastic resin than silane-modified polyolefin, as long as an object of the invention can be achieved. Any thermoplastic resin is not particularly limited.

When the adhesive layer contains, as the thermoplastic resin, a mixture containing silane-modified polyolefin and any other thermoplastic resin, viscosity of the adhesive layer is easily adjustable, facilitating application of processability to the high-frequency dielectric heating adhesive sheet. Further, since unexpected cross-linking reaction can be inhibited, adhesion force is not likely to decrease with time.

When the adhesive layer contains silane-modified polyolefin as a main component of the thermoplastic resin, the adhesive layer easily exhibits high adhesion force to glass.

When the adhesive layer contains silane-modified polyolefin and any other thermoplastic resin, the content ratio of silane-modified polyolefin in the thermoplastic resin (A) in the adhesive layer is preferably 10 vol % or more, more preferably 20 vol % or more, and still more preferably 40 vol % or more. Further, the content ratio of silane-modified polyolefin in the thermoplastic resin (A) in the adhesive layer is preferably 100 vol % or less.

In terms of, for example, meltability and possession of a predetermined heat resistance, any other thermoplastic resin is preferably at least one selected from the group consisting of a polyolefin resin, a styrene resin, a polyacetal resin, a polycarbonate resin, a poly(meth)acrylic resin, a polyamide resin, a polyimide resin, a polyvinyl acetate resin, a phenoxy resin, and a polyester resin.

Herein, the polyolefin resin as "any other thermoplastic resin" includes a polyolefin resin having a polar site and a polyolefin resin having no polar site, and is different from silane-modified polyolefin. The wording of a polyolefin resin having a polar site or a polyolefin resin having no polar site is used in a case where the presence/absence of a polar site in the polyolefin resin is specified.

Also preferably, the adhesive layer further contains, as the thermoplastic resin (A), a polyolefin resin having a polar site. Preferably, the polyolefin resin having the polar site is an acid-modified polyolefin resin.

When the adhesive layer contains silane-modified polyolefin and a polyolefin resin having a polar site, the volume ratio between silane-modified polyolefin and the polyolefin resin having the polar site in the adhesive layer is preferably from 10:90 to 90:10, more preferably from 20:80 to 85:15, and still more preferably from 30:70 to 80:20.

Polyolefin Resin

When the adhesive layer contains a polyolefin resin as the thermoplastic resin (A), examples of the polyolefin resin include a resin including a homopolymer such as polyethylene, polypropylene, polybutene, and polymethylpentene, and an α-olefin resin including a copolymer of a monomer selected from the group consisting of ethylene, propylene, butene, hexene, octene, and 4-methylpentene. The polyolefin resin as the thermoplastic resin (A) may be a single type of resin or a combination of two or more types of resins.

Polyolefin Resin Having Polar Site

Regarding a polyolefin resin having a polar site, the polar site is not particularly limited as long as the site can polarize the polyolefin resin. The polyolefin resin having the polar site is preferable as exhibiting high adhesion force with respect to an adherend.

The polyolefin resin having the polar site may be a copolymer of an olefin monomer and a monomer having a polar site. Further, the polyolefin resin having the polar site may be a resin provided by introducing, through modification such as addition reaction, a polar site into an olefin polymer obtained by polymerizing olefin monomers.

The type of the olefin monomer constituting the polyolefin resin having the polar site is not particularly limited. Examples of the olefin monomer include ethylene, propylene, butene, hexene, octene, and 4-methyl-1-pentene. One of the above examples may be used alone or a combination of two or more thereof may be used as the olefin monomer.

Preferably, the olefin monomer is at least one of ethylene or propylene in view of exhibiting excellent mechanical strength and stable adhesive characteristics.

Preferably, a constituent unit derived from olefin in the polyolefin resin having the polar site is a constituent unit derived from ethylene or propylene.

Examples of the polar site include a hydroxyl group, a carboxy group, an epoxy group, a vinyl acetate structure, and an acid anhydride structure. Further, the polar site is also exemplified by an acid-modified structure that is introduced into a polyolefin resin by acid modification.

The acid-modified structure as a polar site is a site that is introduced by acid modification of a thermoplastic resin (e.g., a polyolefin resin). A compound used for acid modification of a thermoplastic resin (e.g., polyolefin resin) is exemplified by an unsaturated carboxylic acid derivative component derived from any one of an unsaturated carboxylic acid, an acid anhydride of an unsaturated carboxylic acid, and an ester of an unsaturated carboxylic acid. Herein, the polyolefin resin having the acid-modified structure is occasionally referred to as an acid-modified polyolefin resin.

Examples of the unsaturated carboxylic acid include an acrylic acid, a methacrylic acid, a maleic acid, a fumaric acid, an itaconic acid, and a citraconic acid.

Examples of the acid anhydride of the unsaturated carboxylic acid include maleic anhydride, itaconic anhydride, and citraconic anhydride.

Examples of the ester of the unsaturated carboxylic acid include methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalate anhydride.

When the polyolefin resin as the thermoplastic resin (A) is a copolymer of an olefin monomer and a monomer having a polar site, the copolymer contains a constituent unit derived from the monomer having the polar site at a content of preferably 2 mass % or more, more preferably 4 mass % or more, still more preferably 5 mass % or more, and still further more preferably 6 mass % or more. Further, the copolymer contains a constituent unit derived from the monomer having the polar site at a content of preferably 30 mass % or less, more preferably 25 mass % or less, still more preferably 20 mass % or less, and still further more preferably 15 mass % or less.

The copolymer containing 2 mass % or more of a constituent unit derived from the monomer having the polar site improves the bonding strength of the high-frequency dielectric heating adhesive sheet. Further, the copolymer containing 30 mass % or less of a constituent unit derived from the monomer having the polar site inhibits an extreme increase in tackiness of the thermoplastic resin (A). As a result, the high-frequency dielectric heating adhesive sheet is not likely to have difficulty in a forming process.

When the polyolefin resin as the thermoplastic resin (A) has an acid-modified structure, the rate of acid modification is preferably 0.01 mass % or more, more preferably 0.1 mass % or more, and still more preferably 0.2 mass % or more.

When the polyolefin resin as the thermoplastic resin (A) has an acid-modified structure, the rate of acid modification is preferably 30 mass % or less, more preferably 20 mass % or less, and still more preferably 10 mass % or less.

When the thermoplastic resin (A) has an acid-modified structure, a rate of acid modification of 0.01 mass % or more improves the bonding strength of the high-frequency dielectric heating adhesive sheet. Further, a rate of acid modification of 30 mass % or less inhibits an extreme increase in tackiness of the thermoplastic resin (A). As a result, the high-frequency dielectric heating adhesive sheet is not likely to have difficulty in a forming process.

Herein, the rate of acid modification refers to a percentage of a mass of a site derived from the acid relative to a total mass of the acid-modified polyolefin.

Maleic Anhydride-Modified Polyolefin

More preferably, the polyolefin resin as the thermoplastic resin (A) has an acid anhydride structure as an acid-modified structure. More preferably, the acid anhydride structure is a maleic anhydride structure. The maleic anhydride structure may be a group introduced by graft-modification of a thermoplastic resin or a maleic anhydride copolymer obtained by copolymerization of a monomer having a maleic anhydride structure.

In maleic anhydride-modified polyolefin, the rate of maleic anhydride modification is preferably in a range similar to that of the rate of modification in a case where the polyolefin resin as the thermoplastic resin (A) has an acid-modified structure. The effect achievable by virtue of the rate being in the range is also similar to that achievable in a case where the polyolefin resin as the thermoplastic resin (A) has an acid-modified structure.

When the maleic anhydride-modified polyolefin is a copolymer of an olefin monomer and a monomer having a maleic anhydride structure, the ratio of a constituent unit derived from the monomer having the maleic anhydride structure in the copolymer is preferably in a range similar to that of the ratio of a constituent unit derived from a monomer having a polar site in a copolymer of an olefin monomer and the monomer having the polar site. The effect achievable by virtue of the ratio being in the range is also similar to that achievable in a case where the polyolefin resin as the thermoplastic resin (A) is a copolymer of an olefin monomer and a monomer having a polar site.

Preferably, a constituent unit derived from olefin in the maleic anhydride-modified polyolefin is a constituent unit derived from ethylene or propylene. That is, the maleic anhydride-modified polyolefin is preferably a maleic anhydride-modified polyethylene resin or a maleic anhydride-modified polypropylene resin.

The adhesive layer may contain silane-modified polyolefin as the thermoplastic resin (A) and an acid-modified resin as any other thermoplastic resin. In this case, since the acid-modified resin is also excellent in adhesion performance to glass, adhesion strength is not likely to decrease even when the ratio of the silane-modified polyolefin in the adhesive layer is small. When the adhesive layer contains silane-modified polyolefin and an acid-modified resin as the thermoplastic resin (A), the total of volume content ratios of the silane-modified polyolefin and the acid-modified resin in the thermoplastic resin (A) is preferably 80 vol % or more, more preferably 90 vol % or more, and still more preferably 99 vol % or more.

Dielectric Filler (B)

The dielectric filler (B) generates heat upon application of a high-frequency electric field.

Preferably, the dielectric filler (B) is a filler that generates heat upon application of a high-frequency electric field having a frequency range of 3 MHz to 300 MHz. Preferably, the dielectric filler (B) is a filler that generates heat upon application of a high-frequency electric field having, within the frequency range of 3 MHz to 300 MHz, for example, a frequency of 13.56 MHz, 27.12 MHz, or 40.68 MHz.

Type of Dielectric Filler (B)

The dielectric filler (B) is preferably a single one or a combination of two or more of zinc oxide, silicon carbide (SiC), anatase-type titanium oxide, barium titanate, barium titanate zirconate, lead titanate, potassium niobate, rutile-type titanium oxide, hydrated aluminum silicate, inorganic substances having crystallization water such as hydrated aluminosilicate salt of alkali metal, and inorganic substances having crystallization water such as hydrated aluminosilicate salt of alkaline earth metal.

Preferably, the dielectric filler (B) contains at least one selected from the group consisting of zinc oxide, silicon carbide, barium titanate, and titanium oxide.

The dielectric filler (B) is further preferably zinc oxide from among the dielectric fillers exemplified above, because zinc oxide has a lot of types, and various shapes and sizes thereof are selectable, which allows for improving the adhesive characteristics and mechanical characteristics of the high-frequency dielectric heating adhesive sheet in accordance with the purpose of use. Using zinc oxide as the dielectric filler (B) results in a colorless high-frequency dielectric heating adhesive sheet. Zinc oxide is small in density among dielectric fillers. Thus, when adherends are bonded using a high-frequency dielectric heating adhesive sheet that contains zinc oxide as the dielectric filler (B), a total weight of the joined body is less likely to increase than a case where a sheet containing another dielectric filler is used. Zinc oxide, which is not extremely high in hardness among ceramics, is not likely to damage a device for producing a high-frequency dielectric heating adhesive sheet. Zinc oxide, which is an inactive oxide, is blendable with a thermoplastic resin with a small damage thereto.

Further, titanium oxide as the dielectric filler (B) is preferably at least one of anatase-type titanium oxide or rutile-type titanium oxide, more preferably anatase-type titanium oxide in terms of an excellent dielectric property.

Volume Content Ratio

The volume content ratio of the dielectric filler (B) in the adhesive layer is preferably 5 vol % or more, more preferably 8 vol % or more, and still more preferably 10 vol % or more.

The volume content ratio of the dielectric filler (B) in the adhesive layer is preferably 50 vol % or less, more preferably 40 vol % or less, still more preferably 35 vol % or less, and still further more preferably 25 vol % or less.

At a volume content ratio of the dielectric filler (B) in the adhesive layer of 5 vol % or more, heat generation performance is improved, and the adhesive layer and the adherend made of glass are likely to be firmly bonded.

At a volume content ratio of the dielectric filler (B) in the adhesive layer of 50 vol % or less, flexibility as a sheet is easily obtainable and a decrease in toughness is easily preventable, facilitating machining of the high-frequency dielectric heating adhesive sheet into a desired form in a subsequent process.

Since the thermoplastic resin (A) and the dielectric filler (B) are contained in the high-frequency dielectric heating adhesive sheet according to the exemplary embodiment, the volume content ratio of the dielectric filler (B) is preferably 5 vol % or more, more preferably 8 vol % or more, and still more preferably 10 vol % or more with respect to a total volume of the thermoplastic resin (A) and the dielectric filler (B). Further, the volume content ratio of the dielectric filler (B) is preferably 50 vol % or less, more preferably 40 vol % or less, still more preferably 35 vol % or less, and still further more preferably 25 vol % or less with respect to a total volume of the thermoplastic resin (A) and the dielectric filler (B).

The above explanation about the volume content ratio of the dielectric material in the adhesive layer is made assuming that the dielectric material is the dielectric filler (B). The volume content ratio of the dielectric material in the adhesive layer as described above is not limited to the case where the dielectric material is the dielectric filler (B). The volume content ratio of any other dielectric material than the dielectric filler (B) also preferably has a similar range to that of the volume content ratio of the dielectric filler (B) in the adhesive layer. Specifically, the volume content ratio of the dielectric material in the adhesive layer is preferably in a range from 5 vol % to 50 vol %.

Average Particle Diameter

The volume average particle diameter of the dielectric filler (B) is preferably 1 µm or more, more preferably 2 µm or more, and still more preferably 3 µm or more.

The volume average particle diameter of the dielectric filler (B) is preferably 30 µm or less, more preferably 25 µm or less, and still more preferably 20 µm or less.

At a volume average particle diameter of the dielectric filler (B) of 1 µm or more, the high-frequency dielectric heating adhesive sheet exhibits high heat generation performance upon application of a high-frequency electric field, and the adhesive layer and the adherend made of glass can be firmly bonded in a short time.

At a volume average particle diameter of the dielectric filler (B) of 30 µm or less, the high-frequency dielectric heating adhesive sheet exhibits high heat generation performance upon application of a high-frequency electric field, and the adhesive layer and the adherend made of glass can be firmly bonded in a short time. Further, a decrease in strength of the high-frequency dielectric heating adhesive sheet is preventable at a volume average particle diameter of the dielectric filler (B) of 30 µm or less.

The volume average particle diameter of the dielectric filler (B) is measured by a method as described below. A particle size distribution of the dielectric filler (B) is measured by a laser diffraction/scattering method and the volume average particle diameter is calculated from a result of the particle size distribution measurement in accordance with JIS Z 8819-2: 2001.

In the high-frequency dielectric heating adhesive sheet according to the exemplary embodiment, an average particle diameter $D_F$ of the dielectric filler (B) and a thickness T of the adhesive layer preferably satisfy a relation of $1 \leq T/D_F \leq 2500$.

$T/D_F$ is preferably 1 or more, preferably 2 or more, preferably 5 or more, more preferably 10 or more, and still more preferably 20 or more. When $T/D_F$ is 1 or more, a decrease in bonding strength due to the contact between the dielectric filler (B) and the adherend at the time of bonding is preventable.

$T/D_F$ is preferably 2,500 or less, preferably 2,000 or less, preferably 1,750 or less, more preferably 1,000 or less, still more preferably 500 or less, still further more preferably 100 or less, and yet still further more preferably 50 or less. When $T/D_F$ is 2,500 or less, a load on a sheet production device during production of the high-frequency dielectric heating adhesive sheet can be reduced.

Additives

The high-frequency dielectric heating adhesive sheet according to the exemplary embodiment may or may not contain an additive. When the high-frequency dielectric heating adhesive sheet according to the exemplary embodiment includes a plurality of layers, at least one of the layers may or may not contain an additive. When at least one of the layers contains an additive, the adhesive layer may or may not contain an additive.

When the high-frequency dielectric heating adhesive sheet according to the exemplary embodiment contains an additive, examples of the additive include a tackifier, a plasticizer, a wax, a colorant, an antioxidant, an ultraviolet absorber, an antimicrobial agent, a coupling agent, a viscosity modifier, an organic filler, and an inorganic filler. The organic filler and inorganic filler as the additive are different from the dielectric material (dielectric filler).

The tackifier and plasticizer allow for improving the melting characteristics and adhesive characteristics of the high-frequency dielectric heating adhesive sheet.

Examples of the tackifier include a rosin derivative, a polyterpene resin, an aromatic modified terpene resin, a hydride of an aromatic modified terpene resin, a terpene phenol resin, a coumarone-indene resin, an aliphatic petroleum resin, an aromatic petroleum resin, and a hydride of an aromatic petroleum resin.

Examples of the plasticizer include a petroleum process oil, a natural oil, diacid dialkyl, and a low-molecular-weight liquid polymer. Examples of the petroleum process oil include a paraffin process oil, a naphthene process oil, and an aromatic process oil. Examples of the natural oil include a castor oil and a tall oil. Examples of diacid dialkyl include dibutyl phthalate, dioctyl phthalate, and dibutyl adipate. Examples of the low-molecular-weight liquid polymer include liquid polybutene and liquid polyisoprene.

When the high-frequency dielectric heating adhesive sheet according to the exemplary embodiment contains an additive, the content ratio of the additive in the high-frequency dielectric heating adhesive sheet is, normally, based on a total mass of the high-frequency dielectric heating adhesive sheet, preferably 0.01 mass % or more, more preferably 0.05 mass % or more, and still more preferably 0.1 mass % or more. Further, the content ratio of the additive in the high-frequency dielectric heating adhesive sheet is preferably 20 mass % or less, more preferably 15 mass % or less, and still more preferably 10 mass % or less.

The high-frequency dielectric heating adhesive sheet according to the exemplary embodiment preferably contains no solvent. The high-frequency dielectric heating adhesive sheet containing no solvent is not likely to have a problem of volatile organic compounds (VOC) that may otherwise be caused by an adhesive agent used for bonding with an adherend.

Preferably, the adhesive layer of the high-frequency dielectric heating adhesive sheet according to the exemplary embodiment contains no conductive substance such as a metal, carbon, or a carbon compound containing carbon as a main component (e.g., carbon black). Preferably, the adhesive layer does not contain, for example, carbon steel, α iron, γ iron, δ iron, copper, brass, aluminum, iron-nickel alloy, iron-nickel-chromium alloy, carbon fiber, and carbon black.

When the adhesive layer contains conductive substances, the content ratios of the conductive substances in the adhesive layer are each independently, based on a total mass of the adhesive layer, preferably 20 mass % or less, more preferably 10 mass % or less, still more preferably 5 mass % or less, still further more preferably 1 mass % or less, and yet still further more preferably 0.1 mass % or less.

Particularly preferably, the adhesive layer contains 0 mass % of the conductive substances.

When the adhesive layer contains 20 mass % or less of the conductive substances, a problem of carbonization of a bonding portion and an adherend caused by electrical breakdown in a dielectric heating treatment is easily preventable.

The total of the content ratios of the thermoplastic resin (A) and the dielectric filler (B) in the adhesive layer of the high-frequency dielectric heating adhesive sheet according to the exemplary embodiment is preferably 80 mass % or more, more preferably 90 mass % or more, and still more preferably 99 mass % or more.

An exemplary high-frequency dielectric heating adhesive sheet according to the exemplary embodiment consists of a single adhesive layer with the high-frequency dielectric adhesive property. Note that the high-frequency dielectric heating adhesive sheet according to the invention is not limited to the above exemplary sheet (sheet consisting of a single adhesive layer), but is also exemplified by a high-frequency dielectric heating adhesive sheet including any other layer than the adhesive layer.

As described above, the high-frequency dielectric heating adhesive sheet may consist of a single adhesive layer with the high-frequency dielectric adhesive property. Thus, herein, the terms "high-frequency dielectric heating adhesive sheet" and "adhesive layer" are occasionally interchangeable.

Figure 1A:
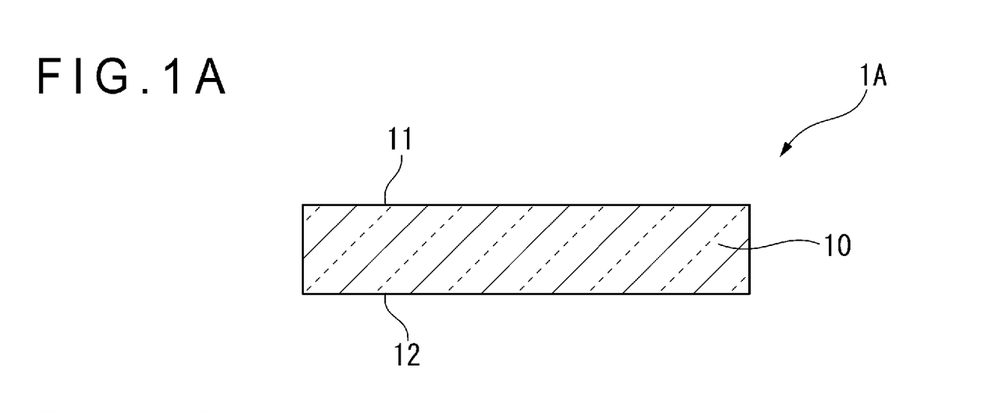
FIG. 1A is a schematic cross-sectional view of an exemplary high-frequency dielectric heating adhesive sheet.
Figure 1B:
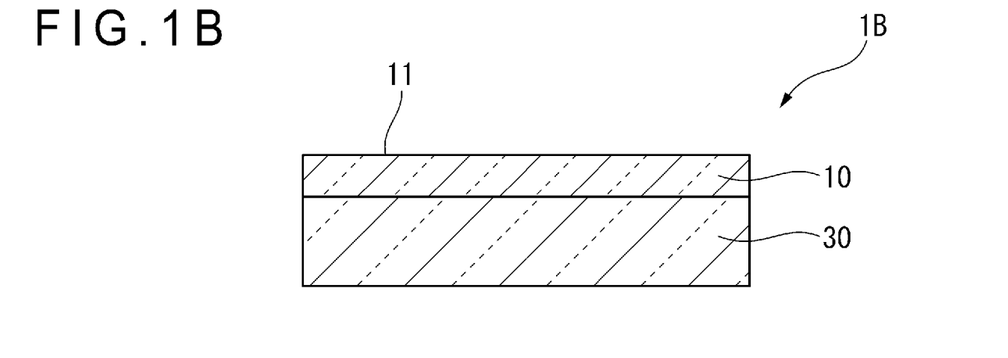
FIG. 1B is a schematic cross-sectional view of another exemplary high-frequency dielectric heating adhesive sheet.
Figure 1C:
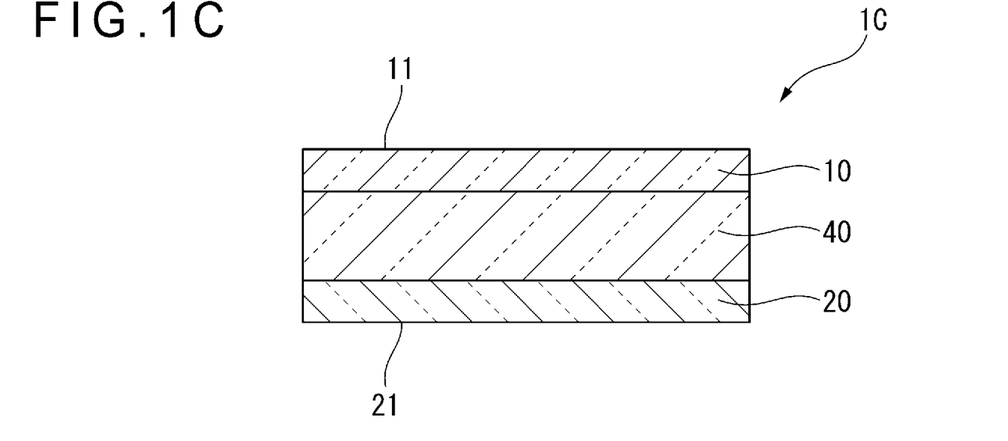
FIG. 1C is a schematic cross-sectional view of still another exemplary high-frequency dielectric heating adhesive sheet.

FIGS. 1A to 1C are schematic diagrams of multiple examples of the high-frequency dielectric heating adhesive sheet according to the exemplary embodiment.

A high-frequency dielectric heating adhesive sheet 1A shown in FIG. 1A consists of a single adhesive layer 10. The high-frequency dielectric heating adhesive sheet 1A has a first surface 11 and a second surface 12 opposite the first surface 11.

Preferably, the high-frequency dielectric heating adhesive sheet consists of a single adhesive layer. The high-frequency dielectric heating adhesive sheet consisting of a single adhesive layer can have a small thickness and be easy to form.

A high-frequency dielectric heating adhesive sheet 1B shown in FIG. 1B includes the adhesive layer 10 and a base material 30 supporting the adhesive layer 10. Similar to the high-frequency dielectric heating adhesive sheet 1A, the adhesive layer 10 has the first surface 11. The base material 30, which may be any member that can support the adhesive layer 10, is exemplified by a resin film or a resin sheet that contains at least one resin selected from the group consisting of a polyolefin resin such as a polyethylene resin and a polypropylene resin, a polyester resin such as a polybutylene terephthalate resin and a polyethylene terephthalate resin, an acetate resin, an ABS resin, a polystyrene resin, and a vinyl chloride resin. The base material 30 may contain the dielectric filler (B). The dielectric filler (B) in the adhesive layer 10 and the dielectric filler in the base material 30 are mutually the same or different.

A high-frequency dielectric heating adhesive sheet 1C shown in FIG. 1C includes the adhesive layer 10, an adhesive layer 20, and an intermediate layer 40 provided between the adhesive layer 10 and the adhesive layer 20. The high-frequency dielectric heating adhesive sheet 1C has the first surface 11 and a second surface 21 that are opposite surfaces. The adhesive layer 10 of the high-frequency dielectric heating adhesive sheet 1C is occasionally referred to as a first adhesive layer, and the adhesive layer 20 is occasionally referred to as a second adhesive layer. In a high-frequency dielectric heating adhesive sheet in which the intermediate layer is provided between the first adhesive layer and the second adhesive layer, it is only required that the first adhesive layer satisfies the conditions for the adhesive layer of the high-frequency dielectric heating adhesive sheet according to the exemplary embodiment. In an example, both the first adhesive layer and the second adhesive layer have the same composition and characteristics. In another example, the second adhesive layer is a high-frequency dielectric heating adhesive layer different from the first adhesive layer in at least one of the composition or the characteristics. In still another example, the second adhesive layer is a normal adhesive agent layer different from the high-frequency dielectric heating adhesive layer, and the second adhesive layer without high-frequency dielectric heating adhesive property is exemplified by a dry-solidifying-type adhesive agent layer that is dried and solidified by evaporation of water or a solvent, or a sticky agent layer formed from a sticky agent (pressure-sensitive adhesive agent).

Form and Characteristics of High-Frequency Dielectric Heating Adhesive Sheet

An exemplary high-frequency dielectric heating adhesive sheet according to the exemplary embodiment may consist of a single adhesive layer, and another exemplary high-frequency dielectric heating adhesive sheet according to the exemplary embodiment may include a plurality of layers. In the high-frequency dielectric heating adhesive sheet consisting of a single adhesive layer, the adhesive layer itself corresponds to the high-frequency dielectric heating adhesive sheet. The form and characteristics of the high-frequency dielectric heating adhesive sheet thus correspond to those of the adhesive layer.

Softening Temperature

The softening temperature of the high-frequency dielectric heating adhesive sheet according to the exemplary embodiment is preferably 50 degrees C. or more, more preferably 55 degrees C. or more, and still more preferably 60 degrees C. or more.

The softening temperature of the high-frequency dielectric heating adhesive sheet according to the exemplary embodiment is preferably 160 degrees C. or less, more preferably 130 degrees C. or less, and still more preferably 100 degrees C. or less.

The high-frequency dielectric heating adhesive sheet having a softening temperature of 50 degrees C. or more is not likely to be deformed when external force is applied to a joined body obtained by bonding an adherend made of glass with the high-frequency dielectric heating adhesive sheet. The feature that the high-frequency dielectric heating adhesive sheet is not likely to deformed is favorable, for example, for the joined body used in an environment where temperature is likely to be high. The high-frequency dielectric heating adhesive sheet having a softening temperature of 50 degrees C. or more is favorable, for example, for outdoor applications such as a building structure and a movable body (e.g., a motor vehicle).

The high-frequency dielectric heating adhesive sheet having a softening temperature of 160 degrees C. or less easily exhibits bonding strength in a short time.

The softening temperature of the high-frequency dielectric heating adhesive sheet can be measured by a method described below. Using a drop flow tester (model No. "CFT-100D" produced by Shimadzu Corporation), a stroke displacement rate (mm/min) that depends on rising temperature is measured at a sample-temperature-increase rate of 10 degrees C./min under test conditions described below to obtain a temperature-dependent chart of the stroke displacement rate of a measurement sample. In this chart, a peak-top temperature on a low-temperature side is determined as the softening temperature. The softening temperature is measured using a 3-mm square sample in flake form, which is obtained by cutting the high-frequency dielectric heating adhesive sheet.

Test Conditions of Drop Flow Tester
  Test temperature: 190 degrees C.
  Load: 5 kg
  Die: hole shape with 2.0-mm diameter and 5.0-mm length
  Cylinder Diameter: 11.329 mm Storage Modulus The storage modulus at 20 degrees C. of the high-frequency dielectric heating adhesive sheet according to the exemplary embodiment is preferably 5 MPa or more, more preferably 10 MPa or more, and still more preferably 20 MPa or more.

The storage modulus at 20 degrees C. of the high-frequency dielectric heating adhesive sheet according to the exemplary embodiment is preferably 600 MPa or less, more preferably 400 MPa or less, still more preferably 300 MPa or less, and still further more preferably 200 MPa or less.

At a storage modulus at 20 degrees C. of 5 MPa or more, the high-frequency dielectric heating adhesive sheet is not too soft and has a freestanding property. Such a sheet is not likely to reduce operation efficiency.

At a storage modulus at 20 degrees C. of 600 MPa or less, the high-frequency dielectric heating adhesive sheet has difficulty in machining.

The storage modulus at 20 degrees C. of the high-frequency dielectric heating adhesive sheet can be measured by a method described in Examples below.

Peak Temperature of Loss Tangent

The peak temperature of loss tangent of the high-frequency dielectric heating adhesive sheet according to the exemplary embodiment is preferably 30 degrees C. or less, more preferably 20 degrees C. or less, still more preferably 10 degrees C. or less, and still further more preferably 0 MPa or less.

Typically, the peak temperature of loss tangent of the high-frequency dielectric heating adhesive sheet is −60 degrees C. or more.

At a peak temperature of loss tangent of the high-frequency dielectric heating adhesive sheet of 30 degrees C. or less, impact resistance in a low-temperature range is easily obtainable. Further, when the peak temperature of the loss tangent is 30 degrees C. or less, the adherend and the adhesive layer are not likely to be separated at an interface due to vibration or impact, easily securing the bonding strength.

The peak temperature of loss tangent of the high-frequency dielectric heating adhesive sheet can be measured by a method described in Examples below.

Thickness of High-Frequency Dielectric Heating Adhesive Sheet

The thickness of the high-frequency dielectric heating adhesive sheet according to the exemplary embodiment is preferably 5 μm or more, more preferably 10 μm or more, still more preferably 30 μm or more, and still further more preferably 50 μm or more.

The high-frequency dielectric heating adhesive sheet having a thickness of 5 μm or more is likely to conform to irregularities of the adherend in bonding thereto, readily exhibiting the bonding strength.

When the high-frequency dielectric heating adhesive sheet has a multilayer configuration provided by a plurality of layers, the thickness of the adhesive layer is preferably 5 μm or more, more preferably 10 μm or more, still more preferably 30 μm or more, and still further more preferably 50 μm or more.

In the high-frequency dielectric heating adhesive sheet having a multilayer configuration, the adhesive layer having a thickness of 5 μm or more is likely to conform to irregularities of the adherend in bonding thereto, readily exhibiting the bonding strength.

The upper limit of the thickness of the high-frequency dielectric heating adhesive sheet is not particularly limited. Since a weight of the entire joined body obtained by bonding the high-frequency dielectric heating adhesive sheet to the adherend increases with an increase in thickness of the high-frequency dielectric heating adhesive sheet, the thickness of the high-frequency dielectric heating adhesive sheet is preferably in a range causing no problem during actual use. In consideration of practicality and formability of the high-frequency dielectric heating adhesive sheet, the thickness of the high-frequency dielectric heating adhesive sheet is preferably 2,000 μm or less, more preferably 1,000 μm or less, and still more preferably 600 μm or less.

Method of Producing High-Frequency Dielectric Heating Adhesive Sheet

The high-frequency dielectric heating adhesive sheet formed of a single layer is producible by: premixing the above components; kneading and molding the premixed components using an extruder and a known kneader such as a heat roller through a known molding process such as extrusion molding, calender molding, injection molding, and casting.

When the high-frequency dielectric heating adhesive sheet according to the exemplary embodiment has a multilayer configuration, the high-frequency dielectric heating adhesive sheet is producible, for example, by premixing the above components and performing a co-extrusion technique using a multilayer extruder. Alternatively, the sheet having a multilayer configuration is also producible by separately forming single-layered sheets (e.g., the first adhesive layer, the intermediate layer, and the second adhesive layer) constituting the high-frequency dielectric heating adhesive sheet according to the exemplary embodiment and layering the single-layered sheets through a lamination treatment. The lamination treatment for the single-layered sheets is performed, for example, by a heat laminator.

Further, the high-frequency dielectric heating adhesive sheet according to the exemplary embodiment is also producible by heat extrusion coating in which a base material is coated with a molten adhesive layer, hot melt coating, or wet coating in which a base material is coated with a coating liquid obtained by dissolving or dispersing an adhesive layer composition into a solvent.

Usage of High-Frequency Dielectric Heating Adhesive Sheet

The high-frequency dielectric heating adhesive sheet according to the exemplary embodiment is usable for bonding with an adherend. Further, the high-frequency dielectric heating adhesive sheet according to the exemplary embodiment is also usable for bonding a plurality of adherends.

The material used for the adherend is not particularly limited. The material used for the adherend may be any one of an organic material and an inorganic material (including a metal material and the like), or may be a composite of the organic and inorganic materials.

Examples of the organic material as the material of the adherend include a plastic material and a rubber material. Examples of the plastic material include a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (e.g., polyethylene terephthalate (PET resin) and polybutylene terephthalate resin (PBT resin)), a polyacetal resin (POM resin), a polymethyl methacrylate resin, and a polystyrene resin. Examples of the rubber material include styrene-butadiene rubber (SBR), ethylene propylene rubber (EPR), and silicone rubber. The adherend may be a foam of the organic material.

Examples of the inorganic material as the material of the adherend include a glass material, a cement material, a ceramic material, and a metal material. Further, the adherend may be a fiber reinforced resin (fiber reinforced plastics (FRP)) that is a composite material of fibers and the above plastic material. The plastic material in the fiber-reinforced resin is at least one resin selected from the group consisting of a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (polyethylene terephthalate (PET resin) and a polybutylene terephthalate resin (PBT resin)), a polyacetal resin (POM resin), a polymethyl methacrylate resin, and a polystyrene resin. Examples of fiber in the fiber-reinforced resin include a glass fiber, a Kevlar fiber, and a carbon fiber.

In a case of bonding a plurality of adherends with the high-frequency dielectric heating adhesive sheet according to the exemplary embodiment, the material of the adherends are the same or different.

The high-frequency dielectric heating adhesive sheet according to the exemplary embodiment is suitably usable for bonding with an adherend made of glass. In a case of bonding a plurality of adherends, if at least one of the adherends is made of glass, the high-frequency dielectric heating adhesive sheet according to the exemplary embodiment can be firmly bonded to the adherend made of glass.

Although the adherend may have any shape, the adherend preferably has a surface to which the high-frequency dielectric heating adhesive sheet is bondable. A sheet-shaped or plate-shaped adherend is preferable. In a case of bonding a plurality of adherends, the shape and size thereof may be the same or different.

Bonding Method

A bonding method according to the exemplary embodiment is a bonding method using the high-frequency dielectric heating adhesive sheet according to the exemplary embodiment.

An exemplary bonding method according to the exemplary embodiment is explained below, using an example where a first adherend is bonded with a second adherend using a high-frequency dielectric heating adhesive sheet formed of a single adhesive layer. The invention, however, is not limited to this example. The material of the second adherend is also not particularly limited.

An exemplary bonding method according to the exemplary embodiment includes a step P1 and a step P2 as below.

Step P1

The step P1 is a step for holding the high-frequency dielectric heating adhesive sheet according to the exemplary embodiment between the first adherend and the second adherend. In the step P1, the first adherend made of glass is brought into contact with a first surface of the high-frequency dielectric heating adhesive sheet. Further, in the step P1, the second adherend is brought into contact with a second surface of the high-frequency dielectric heating adhesive sheet.

The high-frequency dielectric heating adhesive sheet may be held between the first adherend and the second adherend so that the first adherend is bondable to the second adherend. The high-frequency dielectric heating adhesive sheet may be held between the first adherend and the second adherend to partially overlap with the first and second adherends, the high-frequency dielectric heating adhesive sheets may be held at multiple portions between the first adherend and the second adherend, or the high-frequency dielectric heating adhesive sheet may be held between the first adherend and the second adherend to entirely overlap with the first and second adherends. In order to enhance the bonding strength between the first adherend and the second adherend, the high-frequency dielectric heating adhesive sheet is preferably held to entirely overlap with the adhesive surfaces of the first adherend and the second adherend. Further, as an exemplary arrangement in which the high-frequency dielectric heating adhesive sheet is held between the first adherend and the second adherend to partially overlap with the first and second adherends, the high-frequency dielectric heating adhesive sheet, which is frame-shaped, may be placed along outer circumferences of the adhesive surfaces of the first adherend and the second adherend to be held between the first adherend and the second adherend. Such a frame-shaped arrangement of the high-frequency dielectric heating adhesive sheet provides the bonding strength between the first adherend and the second adherend, and reduces the weight of the joined body as compared with an arrangement in which the high-frequency dielectric heating adhesive sheet is placed to entirely overlap with the adhesive surfaces of the adherends. Further, when the high-frequency dielectric heating adhesive sheet is held between the first adherend and the second adherend to partially overlap with the first and second adherends, the size of the high-frequency dielectric heating adhesive sheet in use is small. A time for the high-frequency dielectric heating treatment can thus be shortened as compared with an arrangement in which the high-frequency dielectric heating adhesive sheet is placed to entirely overlap with the adhesive surfaces of the adherends.

Step P2

The step P2 is a step of applying a high-frequency electric field in a range from 3 MHz to 300 MHz to the high-frequency dielectric heating adhesive sheet held between the first adherend and the second adherend in the step P1 to bond the first adherend and the second adherend via the high-frequency dielectric heating adhesive sheet.

For example, a high-frequency electric field can be applied to the high-frequency dielectric heating adhesive sheet using a dielectric heating adhesion device. Herein, a "dielectric heating device" is occasionally referred to as the "dielectric heating adhesion device" or "high-frequency dielectric heating device".

Figure 2:
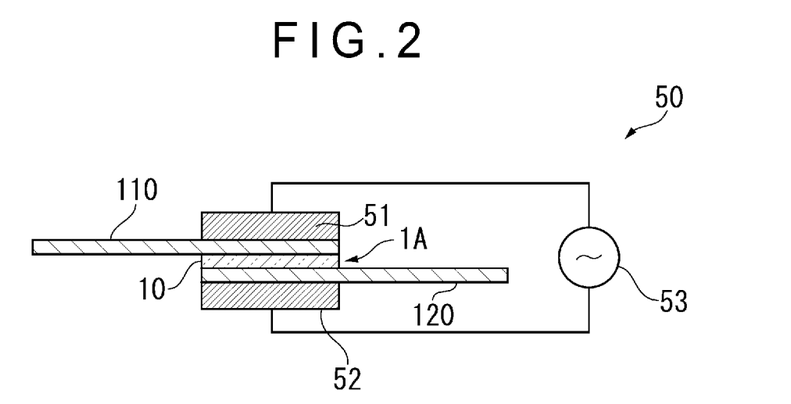
FIG. 2 is schematic diagram for illustrating a high-frequency dielectric heating treatment using the exemplary high-frequency dielectric heating adhesive sheet and a dielectric heating device.

FIG. 2 is a schematic diagram illustrating a high-frequency dielectric heating treatment using the high-frequency dielectric heating adhesive sheet according to the exemplary embodiment and a dielectric heating device.

Dielectric Heating Adhesion Device

FIG. 2 schematically shows a dielectric heating adhesion device 50.

The dielectric heating adhesion device 50 includes a first high-frequency electric field application electrode 51, a second high-frequency electric field application electrode 52, and a high-frequency power source 53.

The first high-frequency electric field application electrode 51 faces the second high-frequency electric field application electrode 52. The first high-frequency electric field application electrode 51 and the second high-frequency electric field application electrode 52 include a press mechanism. The press mechanism enables a first adherend 110, the high-frequency dielectric heating adhesive sheet 1A, and a second adherend 120 to be subjected to a pressure treatment between the first high-frequency electric field application electrode 51 and the second high-frequency electric field application electrode 52.

When the first high-frequency electric field application electrode 51 and the second high-frequency electric field application electrode 52 are in the form of a pair of plate electrodes parallel with each other, such an electrode arrangement is occasionally referred to as a parallel-plate type.

A high-frequency dielectric heating device in a parallel-plate type is also preferably used to apply a high-frequency electric field. The parallel-plate high-frequency dielectric heating device causes high-frequency waves to penetrate through the high-frequency dielectric heating adhesive sheet placed between the electrodes, making it possible to heat the whole of the high-frequency dielectric heating adhesive sheet and to bond the adherends with the high-frequency dielectric heating adhesive sheet in a short time.

The first high-frequency electric field application electrode 51 and the second high-frequency electric field application electrode 52 are each connected to the high-frequency power source 53 for applying a high-frequency electric field having, for example, a frequency of approximately 13.56 MHz, approximately 27.12 MHz, or approximately 40.68 MHz.

As shown in FIG. 2, the dielectric heating adhesion device 50 performs a dielectric heating treatment with the high-frequency dielectric heating adhesive sheet 1A being interposed between the first adherend 110 and the second adherend 120. Further, the dielectric heating adhesion device 50 performs, in addition to the dielectric heating treatment, a pressure treatment using the first high-frequency electric field application electrode 51 and the second high-frequency electric field application electrode 52 to bond the first adherend 110 and the second adherend 120. Note that the first adherend 110 and the second adherend 120 may be bonded to each other without performing the pressure treatment.

When a high-frequency electric field is applied to between the first high-frequency electric field application electrode 51 and the second high-frequency electric field application electrode 52, the dielectric filler (not shown in the drawings), which is dispersed in adhesive agent components of the high-frequency dielectric heating adhesive sheet 1A, absorbs energy of high-frequency waves.

The dielectric filler functions as a heat generation source. The heat generation of the dielectric filler melts thermoplastic resin components, eventually making it possible to firmly bond the first adherend 110 and the second adherend 120 in a short-time.

The first high-frequency electric field application electrode 51 and the second high-frequency electric field application electrode 52, which include the press mechanism, also function as a press device. In this arrangement, pressure is applied in compression directions by the first high-frequency electric field application electrode 51 and the second high-frequency electric field application electrode 52, and the high-frequency dielectric heating adhesive sheet 1A is melt by heating. The first adherend 110 and the second adherend 120 are thus more firmly bonded.

High-Frequency Dielectric Heating Adhesive Conditions

High-frequency dielectric heating adhesive conditions can be modified as appropriate but the following conditions are preferable.

The output of the high-frequency electric field is preferably 10 W or more, more preferably 30 W or more, still more preferably 50 W or more, and still further more preferably 80 W or more.

The output of the high-frequency electric field is preferably 50,000 W or less, more preferably 20,000 W or less, still more preferably 15,000 W or less, still further more preferably 10,000 W or less, and yet still further more preferably 1,000 W or less.

An output of the high-frequency electric field of 10 W or more is not likely to cause a problem in which the temperature has difficulty in increasing in the dielectric heating treatment. Thus, a sufficient adhesion force is easily obtained.

An output of the high-frequency electric field output of 50,000 W or less is not likely to cause a problem in which temperature control by the dielectric heating treatment is difficult.

The application time of the high-frequency electric field is preferably one second or more.

The application time of the high-frequency electric field is preferably 300 seconds or less, more preferably 240 seconds or less, still more preferably 180 seconds or less, still further more preferably 120 seconds or less, and yet still further more preferably 100 seconds or less.

An application time of the high-frequency electric field of one second or more is not likely to cause a problem in which the temperature has difficulty in increasing in the dielectric heating treatment. Thus, a sufficient bonding force is easily obtained.

An application time of the high-frequency electric field of 300 seconds or less is not likely to cause problems of a decrease in production efficiency of the joined body obtained by bonding the first adherend and the second adherend, an increase in production costs, and heat deterioration of the adherends.

The frequency of the high-frequency electric field to be applied is preferably 1 kHz or more, more preferably 1 MHz or more, still more preferably 5 MHz or more, and still further more preferably 10 MHz or more.

The frequency of the high-frequency electric field to be applied is preferably 300 MHz or less, more preferably 100 MHz or less, still more preferably 80 MHz or less, and still further more preferably 50 MHz or less. Specifically, an industrial frequency band of 13.56 MHz, 27.12 MHz, or 40.68 MHz, which is designated by the International Telecommunication Union, is also usable for the high-frequency dielectric heating bonding method (bonding method) of the exemplary embodiment.

Effects of Exemplary Embodiment

The high-frequency dielectric heating adhesive sheet according to the exemplary embodiment is bondable, even with low consumption energy, to glass with high bonding strength.

The high-frequency dielectric heating adhesive sheet according to the exemplary embodiment is not only easy to handle but also improved in workability in bonding to the adherend as compared with a case where an adhesive agent required to be applied is used.

The high-frequency dielectric heating adhesive sheet according to the exemplary embodiment is excellent in water resistance and moisture resistance as compared with a typical sticky agent.

The high-frequency dielectric heating adhesive sheet according to the exemplary embodiment, which is heated through application of a high-frequency electric field, is locally heated. Thus, the high-frequency dielectric heating adhesive sheet according to the exemplary embodiment is not likely to have a problem in which the entire adherend melts at the time of bonding.

In the bonding method using the high-frequency dielectric heating adhesive sheet according to the exemplary embodiment, only a predetermined portion can be locally heated by a dielectric heating adhesion device from the outside. Thus, even when the adherend is in the form of a large-sized and complicated three-dimensional structure, a thickened and complicated three-dimensional structure, or the like, and in addition, high dimensional accuracy is required, the bonding method using the high-frequency dielectric heating adhesive sheet according to the exemplary embodiment is beneficial.

Further, the thickness or the like of the high-frequency dielectric heating adhesive sheet according to the exemplary embodiment can be controlled as appropriate. The high-frequency dielectric heating adhesive sheet according to the exemplary embodiment is thus also usable in a roll-to-roll system and can be machined to have a desired area and shape by punching or the like in accordance with an area of bonding to the adherend and a shape of the adherend. Accordingly, the high-frequency dielectric heating adhesive sheet according to the exemplary embodiment is significantly advantageous also in terms of manufacturing process.

Modifications of Exemplary Embodiment

The invention is not limited to the above exemplary embodiment. The invention can include modifications, improvements, and the like as long as they are compatible with the object of the invention.

A high-frequency dielectric heating adhesive sheet according to another exemplary embodiment different from the above exemplary embodiment is exemplified by a high-frequency dielectric heating adhesive sheet described below.

[1] A high-frequency dielectric heating adhesive sheet according to an exemplary embodiment includes an adhesive layer at least containing the thermoplastic resin (A) and a dielectric material (preferably the dielectric filler (B)) that generates heat upon application of a high-frequency electric field, in which the thermoplastic resin (A) at least contains a first thermoplastic resin (A1) and a second thermoplastic resin (A2), the thermoplastic resin (A1) is silane-modified polyolefin, and the second thermoplastic resin (A2) is any other thermoplastic resin than the silane-modified polyolefin.

[2] In the high-frequency dielectric heating adhesive sheet according to the above [1], the second thermoplastic resin (A2) is preferably a resin having an acid-modified structure.

[3] In the high-frequency dielectric heating adhesive sheet according to the above [1] or [2], the second thermoplastic resin (A2) is preferably a polyolefin resin having an acid-modified structure.

In the high-frequency dielectric heating adhesive sheet according to [1] to [3] above, the silane-modified polyolefin and any other thermoplastic resin than the silane-modified polyolefin are exemplified by the resins described in the above exemplary embodiment.

When the adhesive layer contains, as the thermoplastic resin, a mixture containing silane-modified polyolefin and any other thermoplastic resin, the viscosity of the adhesive layer is easily adjustable and processability is easily applied to the high-frequency dielectric heating adhesive sheet. Further, since unexpected cross-linking reaction can be inhibited, a decrease in adhesion force with time is easily preventable.

The high-frequency dielectric heating adhesive sheet may have a sticky portion. The sticky portion inhibits an offset in position when the high-frequency dielectric heating adhesive sheet is held between adherends, allowing the high-frequency dielectric heating adhesive sheet to be placed at an accurate position. The sticky portion may be provided in one surface or both surfaces of the high-frequency dielectric heating adhesive sheet. Further, the sticky portion may be provided at part(s) of the surface(s) of the high-frequency dielectric heating adhesive sheet. The high-frequency dielectric heating adhesive sheet without the sticky portion can also firmly bond the first adherend and the second adherend.

The high-frequency dielectric heating treatment may be performed by a lattice-electrode high-frequency dielectric heating device without being limited to the dielectric heating adhesion device including the opposed electrodes described in the above exemplary embodiment. The lattice-electrode high-frequency dielectric heating device includes a lattice electrode in which electrodes having a first polarity and electrodes having a second polarity are alternatively arranged at regular intervals in the same surface, the first polarity being opposite to the second polarity.

For example, when a joined body is produced by bonding the first adherend and the second adherend with ends of the first and second adherends overlapping with each other, a high-frequency electric field is applied by the lattice-electrode high-frequency dielectric heating device placed on a side close to the first adherend or a side close to the second adherend.

In bonding the first adherend and the second adherend using the lattice-electrode high-frequency dielectric heating device, a high-frequency electric field may be applied at the same time by a first lattice-electrode disposed at the side close to the first adherend and a second lattice-electrode disposed at the side close to the second adherend with the first adherend, the high-frequency dielectric heating adhesive sheet, and the second adherend being interposed between the first lattice-electrode and the second lattice-electrode.

In bonding the first adherend and the second adherend using the lattice-electrode high-frequency dielectric heating device, a high-frequency electric field may be applied with the lattice electrode disposed on one surface side of the first adherend and the second adherend, and then a high-frequency electric field may be applied with the lattice electrode disposed on the other surface side of the first adherend and the second adherend.

Also preferably, the lattice-electrode high-frequency dielectric heating device is used to apply a high-frequency electric field. The use of the lattice-electrode high-frequency dielectric heating device allows adherends to bond to each other without being affected by the thickness of the first adherend and the second adherend through dielectric heating from a front-layer side of the first adherend and the second adherend (e.g. from an adherend side less distant to the high-frequency dielectric heating adhesive sheet). Further, the use of the lattice-electrode high-frequency dielectric heating device reduces energy required for producing the joined body.

It should be noted that an example using the dielectric heating adhesion device provided with opposed electrodes is exemplary shown in the diagram for the purpose of simplification.

EXAMPLES

The invention will be described below in further detail with reference to Examples. The invention is by no means limited to these Examples.

Preparation of High-Frequency Dielectric Heating Adhesive Sheet (Examples 1 to 5 and Comparatives 1 to 4)

The materials shown in Table 1 were premixed. The premixed material was supplied into a hopper of a 30-mm-diameter twin-screw extruder. Then, the premixed material was melted and kneaded at a cylinder setting temperature in a range from 180 degrees C. to 200 degrees C. and a die temperature of 200 degrees C. The material subjected to the melt kneading was cooled, followed by cut into granular pellets. Subsequently, the resultant granular pellets were loaded into a hopper of a single screw extruder provided with a T-die. Then, a film-shaped melted and kneaded substance was extruded from the T-die (cylinder temperature: 200 degrees C., die temperature: 200 degrees C.) and was cooled by a cooling roll to produce a 400-μm thick high-frequency dielectric heating adhesive sheet for each of Examples 1 to 5 and Comparatives 1 to 4.

Details of the thermoplastic resin and filler shown in Table 1 are as follows:

Silane-modified PE1: silane-modified polyethylene, product name "Linkron SS732N" produced by Mitsubishi Chemical Corporation Silane-modified PE2: silane-modified polyethylene, product name "Linkron SF800N" produced by Mitsubishi Chemical Corporation Silane-modified PP1: silane-modified polypropylene, product name "Linkron PM700N" produced by Mitsubishi Chemical Corporation Silane-modified PP2: silane-modified polypropylene, product name "Linkron PK500N" produced by Mitsubishi Chemical Corporation m-PP: maleic anhydride-modified polypropylene, product name "Modic P565" produced by Mitsubishi Chemical Corporation m-PE: maleic anhydride-modified polyethylene, product name "Modic M545" produced by Mitsubishi Chemical Corporation EVA: ethylene vinyl acetate copolymer, product name "EVAFLEX EV560" produced by DuPont-Mitsui Polychemicals Co., Ltd.

Zinc oxide (ZnO): zinc oxide having a volume average particle diameter of 11 μm, product name "LP-ZINC11" produced by SAKAI CHEMICAL INDUSTRY CO., LTD.

Iron powder: iron powder having a volume average particle diameter of 10 μm

MFR: Melt Flow Rate

The MFR at 190 degrees C. of the thermoplastic resin was measured by a drop flow tester (model No. "CFT-100D" produced by Shimadzu Corporation) in accordance with JIS K 7210-1:2014.

In a case of using a mixture of a plurality of thermoplastic resins, the resins were kneaded with twin screws at each ratio shown in Table 1, preparing a mixed resin pellet. The MFR of the mixed resin pellet was measured as above.

Volume Average Particle Diameter of Dielectric Filler

The particle size distribution of the dielectric filler was measured by a laser diffraction/scattering method. The volume average particle diameter was calculated from a result of the measurement of particle size distribution in accordance with JIS Z 8819-2: 2001. The volume average particle diameter of zinc oxide (ZnO) calculated was 11 μm, and the volume average particle diameter of iron power calculated was 10 μm.

Evaluation of High-Frequency Dielectric Heating Adhesive Sheet

Each high-frequency dielectric heating adhesive sheet was evaluated as follows. Table 1 shows evaluation results.

Wet-Spreadability Evaluation

Figure 3A:
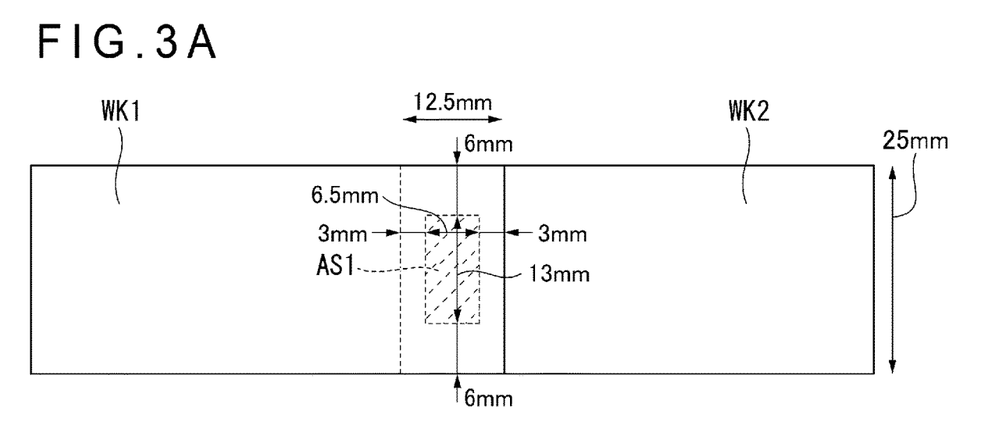
FIG. 3A is a diagram for illustrating evaluation of wet-spreadability of a sheet.
Figure 3B:
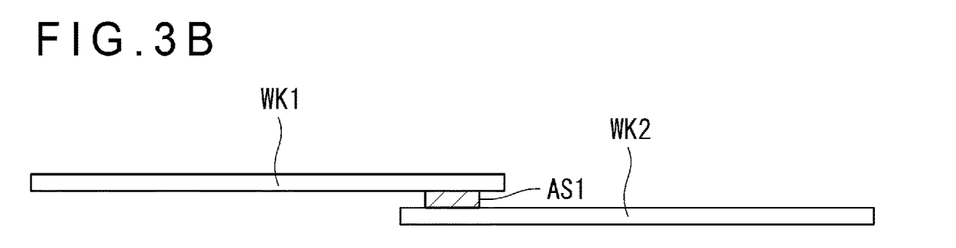
FIG. 3B is another diagram for illustrating evaluation of wet-spreadability of the sheet.

Wet-spreadability of the adhesive sheet was evaluated as an index for the evaluation of high-frequency adhesion performance. The prepared high-frequency dielectric heating adhesive sheet was cut into a size of 13 mm×6.5 mm. The cut high-frequency dielectric heating adhesive sheet was disposed between soda-lime glass (25 mm×100 mm×3 mm (thickness)) as a pair of adherends. An area where soda-lime glass overlapped with each other satisfied 25 mm×12.5 mm=312.5 $mm^2$. Specifically, a glass adherend WK1, a glass adherend WK2, and an adhesive sheet AS1 (corresponding to the prepared high-frequency dielectric heating adhesive sheet) were arranged as shown in FIG. 3B. Dimensions of the adherend WK1, the adherend WK2, and the sheet AS1 were indicated in FIG. 3A. After the arrangement, the adherends and the high-frequency dielectric heating adhesive sheet were fixed between electrodes of a high-frequency dielectric heating device (product name "YRP-400T-A" produced by Yamamoto Vinita Co., Ltd.). The electrodes of the high-frequency dielectric heating device each had an area of 800 $mm^2$ (=40 mm×20 mm), and the electrodes were arranged to cover the overlapping portion of the adherends (soda-lime glass). A high-frequency electric field was applied under high-frequency wave application conditions below with the adherends and the high-frequency dielectric heating adhesive sheet being fixed, bonding the high-frequency dielectric heating adhesive sheet and the adherends.

High-Frequency Wave Application Conditions

Frequency: 40.68 MHz

Output: 200 W

Application Time: 90 seconds

Pressing Pressure: 0.5 MPa

Pressing pressure at the time of high-frequency wave application was a pressure applied to a joint of the first adherend and the second adherend.

After the application of the high-frequency electric field, the area where the first adherend WK1 and the second adherend WK2 overlapped with each other in a plan view was regarded as 100%. Then, the percentage of a wet-spreading area of the adhesive sheet AS1 to the area of the overlapping portion was measured by an image analysis software, evaluating the wet-spreadability of the adhesive sheet in accordance with the following criteria. The ratio of the area of the adhesive sheet to the area of the overlapping portion of the adherends before the application of the high-frequency electric field was 27%.

A: The ratio of the area of the adhesive sheet to the area of the overlapping portion of the adherends was 80% or more.

B: The ratio of the area of the adhesive sheet to the area of the overlapping portion of the adherends was 55% or more and less than 80%.

F: The ratio of the area of the adhesive sheet to the area of the overlapping portion of the adherends was less than 55%.

Figure 3C:
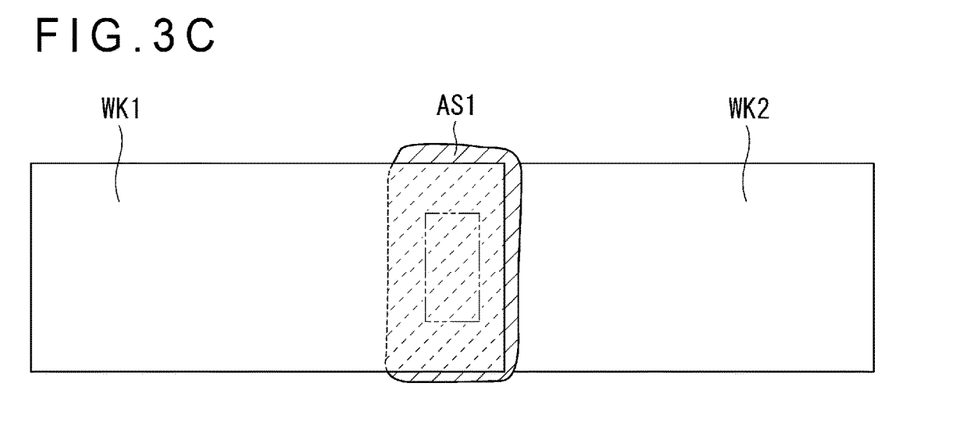
FIG. 3C is still another diagram for illustrating evaluation of wet-spreadability of the sheet.

FIG. 3C is a plan view showing a state where the overlapping portion of adherends was entirely covered with the resin after the application of the high-frequency electric field and the resin spread out of the adherends. This case was evaluated as A.

Adhesion Force (Tensile Shear Strength)

Each test piece for adhesion force evaluation was prepared as above (as in wet-spreadability evaluation) except that the high-frequency dielectric heating adhesive sheet was cut into 25 mm×12.5 mm and the adhesive sheet was placed such that the position of the adhesive sheet matched the position of the overlapping portion of the adherends. The test piece for adhesion force evaluation was subjected to measurement of a tensile shear strength (unit: MPa) as the adhesion force. The tensile shear strength was measured using a universal tensile tester (product name "INSTRON 5581" produced by Instron Corporation). The tensile shear strength was measured at a tension rate of 10 mm/min. Note that "No Bonding" for the tensile shear strength in Table 1 means that the adherend(s) was separated easily from the adhesive sheet before the measurement of the tensile shear strength. Further, "4<" in Table 1 means that the tensile shear strength exceeded 4 MPa.

Furthermore, a breaking mode of the test piece for the evaluation of high-frequency adhesion performance was observed during the measurement of the tensile shear strength to evaluate the adhesion performance in accordance with the criteria below. The tensile shear strength was measured in accordance with JIS K 6850: 1999.

A: High-frequency dielectric heating adhesive sheet had cohesive failure.
B: Adherend was broken.
F: High-frequency dielectric heating adhesive sheet and adherend was separated at the interface.

Softening Temperature

Using a drop flow tester (model No. "CFT-100D" produced by Shimadzu Corporation), a stroke displacement rate (mm/min) that depended on rising temperature was measured at a sample-temperature-increase rate of 10 degrees C./min under test conditions described below to obtain a temperature-dependent chart of the stroke displacement rate of the measurement sample. In this chart, a peak-top temperature on a low-temperature side was determined as the softening temperature. The softening temperature was measured using a 3-mm square sample in flake form, which was obtained by cutting the high-frequency dielectric heating adhesive sheet.

Test Conditions of Drop Flow Tester
  Test Temperature: 190 degrees C.
  Load: 5 kg
  Die: hole shape with 2.0-mm diameter and 5.0-mm length
  Cylinder Diameter: 11.329 mm Storage Modulus and Peak Temperature of Loss Tangent A storage modulus E' at 20 degrees C. of the high-frequency dielectric heating adhesive sheet was obtained by performing viscoelasticity measurement with a dynamic viscoelasticity measuring machine (RHEOVIBRON DDV-01 FP produced by ORIENTEC CO., LTD). Specifically, the high-frequency dielectric heating adhesive sheet having a sample width of 4 mm was set in the dynamic viscoelasticity measuring machine at a distance between measurements (distance between chucks) of 10 mm, and the viscoelasticity of the high-frequency dielectric heating adhesive sheet was measured in a tensile mode at a frequency of 11 Hz, at a strain amount of 0.0015, at a temperature-increase rate of 4 degrees C./min, and at a temperature in a range from −100 degrees C. to 130 degrees C.

The peak temperature of the loss tangent of the high-frequency dielectric heating adhesive sheet was set as a temperature at a maximum point of tan δ (loss modulus/storage modulus) obtained in the above viscoelasticity measurement.

TABLE 1

Composition and Characteristics of High-Frequency Dielectric Heating Adhesive Sheet

| | Thermoplastic Resin (A) | | | | | | | Dielectric Filler (B) | |
|---|---|---|---|---|---|---|---|---|---|
| | Silane-Modified Polyolefin | | | Other Thermoplastic Resins | | | MFR @190° C. [g/10 min] | | |
| | Type | Product Name | [vol %] | Type | Product Name | [vol %] | | Type | Product Name |
| Ex. 1 | Silane-Modified PE1 | Linkron SS732N | 80 | — | — | — | 13 | Zinc Oxide | LP-ZINC11 |
| Ex. 2 | Silane-Modified PP1 | Linkron PM700N | 80 | — | — | — | 15 | Zinc Oxide | LP-ZINC11 |
| Ex. 3 | Silane-Modified PP2 | Linkron PK500N | 80 | — | — | — | 5 | Zinc Oxide | LP-ZINC11 |
| Ex. 4 | Silane-Modified PE1 | Linkron SS732N | 20 | Silane-Modified PE2 | Linkron SF800N | 60 | 3 | Zinc Oxide | LP-ZINC11 |
| Ex. 5 | Silane-Modified PP1 | Linkron PM700N | 40 | m-PP | Modic P565 | 40 | 4 | Zinc Oxide | LP-ZINC11 |
| Comp. 1 | Silane-Modified PE2 | Linkron SF800N | 80 | — | — | — | 0.6 | Zinc Oxide | LP-ZINC11 |
| Comp. 2 | — | — | — | EVA | EVAFLEX EV560 | 80 | 3.5 | Zinc Oxide | LP-ZINC11 |
| Comp. 3 | — | — | — | m-PE | Modic M545 | 80 | 6 | Zinc Oxide | LP-ZINC11 |
| Comp. 4 | Silane-Modified PE1 | Linkron SS732N | 70 | — | — | — | 13 | Iron Powder | — |

TABLE 1-continued

| | Composition and Characteristics of High-Frequency Dielectric Heating Adhesive Sheet | | | | Evaluation | | |
|---|---|---|---|---|---|---|---|
| | | | | | | Tensile Shear Test | |
| | | | | | | Tensile | |
| | Dielectric Filler (B) [vol %] | Softening Temperature [° C.] | Storage Modulus [MPa] | Peak Temperature of Loss Tangent [° C.] | Wet-Spreadability Test Adherend: Glass | Shear Strength [MPa] Adherend: Glass | Breaking Mode Adherend: Glass |
| Ex. 1 | 20 | 66 | 37 | −19 | A | 4< | A |
| Ex. 2 | 20 | 71 | 58 | −14 | A | 2.5 | A |
| Ex. 3 | 20 | 83 | 66 | −11 | A | 4< | A |
| Ex. 4 | 20 | 77 | 40 | −13 | A | 4< | A |
| Ex. 5 | 20 | 73 | 210 | 3 | A | 4< | A |
| Comp. 1 | 20 | 83 | 42 | −11 | F | No Bonding | F |
| Comp. 2 | 20 | 86 | 92 | −7 | A | No Bonding | F |
| Comp. 3 | 20 | 99 | 136 | 1 | A | No Bonding | F |
| Comp. 4 | 30 | 69 | 48 | −12 | F | No Bonding | F |

The high-frequency dielectric heating adhesive sheet in each of Examples 1 to 5 bonded, even with small consumption energy, adherends made of glass with high bonding strength.

The invention claimed is:

1. A high-frequency dielectric heating adhesive sheet comprising an adhesive layer that at least comprises a thermoplastic resin (A) and a dielectric material that generates heat upon application of a high-frequency electric field, wherein
the thermoplastic resin (A) includes silane-modified polyolefin,
the adhesive layer contains no conductive substance,
a melt flow rate (MFR) at 190 degrees C. of the thermoplastic resin (A) is in a range from 2 g/10 min to 50 g/10 min,
the silane-modified polyolefin is at least one selected from the group consisting of a copolymer of a silyl group-containing compound and olefin, and silane-modified polyolefin in which a silyl group-containing compound is graft-polymerized onto polyolefin,
the olefin is at least one selected from the group consisting of ethylene, propylene, 1-butene, 1-pentene, 1-hexene, 1-octene, 1-heptene, 4-methyl-1-pentene, 4-methyl-1-hexene, and 4,4-dimethyl-1-pentene, and
the polyolefin onto which the silyl group-containing compound is graft-polymerized is a homopolymer of propylene, 1-butene, 1-pentene, 1-hexene, 1-octene, 1-heptene, 4-methyl-1-pentene, 4-methyl-1-hexene, or 4,4-dimethyl-1-pentene, or a copolymer of two or more thereof.

2. The high-frequency dielectric heating adhesive sheet according to claim 1, wherein a softening temperature of the high-frequency dielectric heating adhesive sheet is 50 degrees C. or more.

3. The high-frequency dielectric heating adhesive sheet according to claim 1, wherein a storage modulus at 20 degrees C. of the high-frequency dielectric heating adhesive sheet is 5 MPa or more.

4. The high-frequency dielectric heating adhesive sheet according to claim 1, wherein a peak temperature of a loss tangent of the high-frequency dielectric heating adhesive sheet is 30 degrees C. or less.

5. The high-frequency dielectric heating adhesive sheet according to claim 1, wherein a volume content ratio of the dielectric material in the adhesive layer is in a range from 5 vol % to 50 vol %.

6. The high-frequency dielectric heating adhesive sheet according to claim 1, wherein the dielectric material is a dielectric filler (B).

7. The high-frequency dielectric heating adhesive sheet according to claim 6, wherein the dielectric filler (B) comprises at least one selected from the group consisting of zinc oxide, silicon carbide, barium titanate, and titanium oxide.

8. The high-frequency dielectric heating adhesive sheet according to claim 6, wherein a volume average particle diameter of the dielectric filler (B) is in a range from 1 μm to 30 μm, and
the volume average particle diameter is a volume average particle diameter obtained by measuring a particle size distribution of the dielectric filler (B) by a laser diffraction/scattering method and performing calculation from a result of the particle size distribution measurement in accordance with JIS Z 8819-2: 2001.

9. The high-frequency dielectric heating adhesive sheet according to claim 1, wherein a thickness of the high-frequency dielectric heating adhesive sheet is 5 μm or more.

10. The high-frequency dielectric heating adhesive sheet according to claim 6, wherein the dielectric filler (B) is a single one or a combination of two or more of zinc oxide, silicon carbide (SiC), anatase-type titanium oxide, rutile-type titanium oxide, hydrated aluminum silicate, an inorganic substance having crystallization water selected from hydrated aluminosilicate salt of alkali metal, and an inorganic substance having crystallization water selected from hydrated aluminosilicate salt of alkaline earth metal.

11. The high-frequency dielectric heating adhesive sheet according to claim 1, wherein a content ratio of the silane-modified polyolefin in the thermoplastic resin (A) is 10 vol % or more and 100 vol % or less.

12. The high-frequency dielectric heating adhesive sheet according to claim 1, wherein the silane-modified polyolefin is silane-modified polypropylene.

* * * * *